March 21, 1944.  E. G. KRANTZ  2,344,704
TIRE TOOL
Filed April 19, 1941
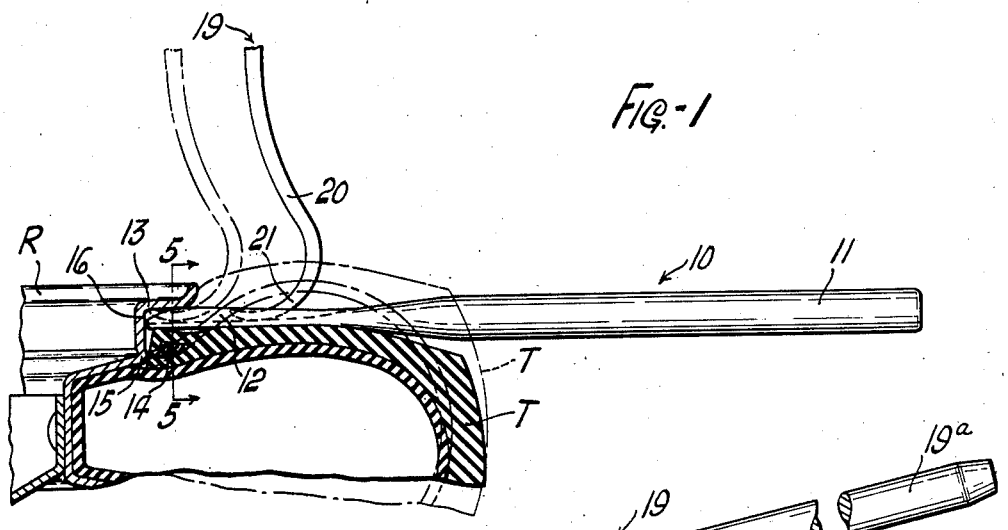
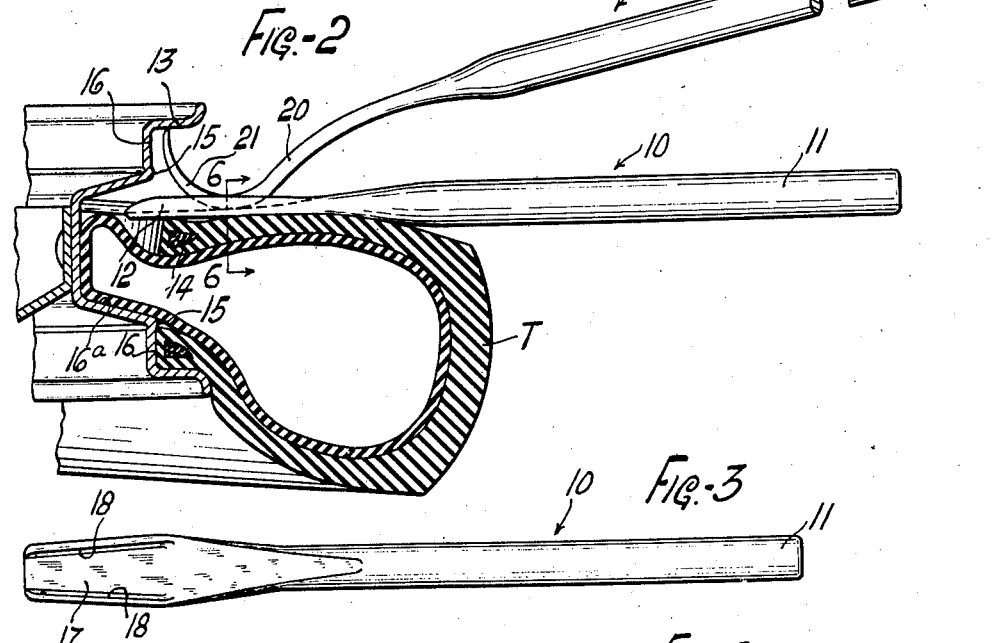
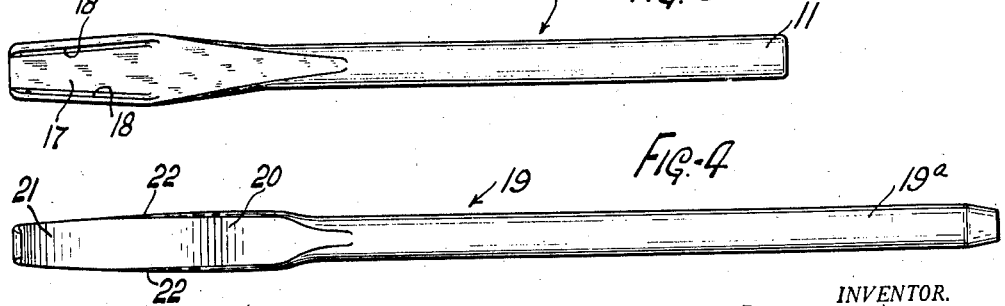
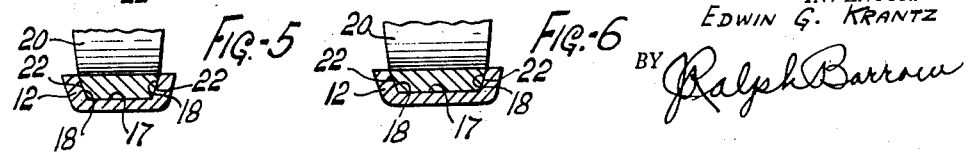
INVENTOR.
EDWIN G. KRANTZ
BY Ralph Barrow Patented Mar. 21, 1944

2,344,704

UNITED STATES PATENT OFFICE 2,344,704

TIRE TOOL

Edwin G. Krantz, Girard, Ohio, assignor to The Ken-Tool Manufacturing Company, Akron, Ohio, a corporation of Ohio Application April 19, 1941, Serial No. 389,364

4 Claims. (Cl. 157—6)

This invention relates to tire tools, and in particular relates to tire tools for use in removing pneumatic tires from so-called safety drop-center rims, which have annular ridges on the bead seats thereof for engagement with the inner edges of the tire beads to lock the same in position against the rim flanges.

Heretofore, tools of the character described have been provided for the present purpose, but these usually have required the provision of special means for clamping or anchoring the tool to the rim, or to some other portion of a wheel assembly from which a tire is to be removed. Such anchoring means usually have complicated the operation of the tool, or have been otherwise unsatisfactory, as for example for removing tires from safety rims while the wheel assemblies were mounted on a vehicle. Tools employing separable jaws for an insertion between an annular tire bead and its rim flange have also been suggested, but these have been unsatisfactory because of the tendency of the jaws, when urged apart, to work outwardly from between the bead and its rim flange.

A general object of this invention is to provide a simple, efficient, and relatively inexpensive tire tool for effectively urging tire beads inwardly past the annular locking ridges of so-called safety type rims, with a minimum of effort and without requiring special skill for operating the tool.

A particular object of the invention is to provide a tool of the character described having cooperating jaws insertable between the tire bead and its rim flange, the tool being operable to urge the jaws apart and thereby to urge the tire bead inwardly past the annular locking ridge on the bead seat of the rim, and the construction of the tool being such that operation of the same to urge the jaws thereof apart will tend to urge the jaws inwardly of the rim so that the usual necessity of having separate means for anchoring or clamping the tool to the rim, or to other portions of a wheel assembly, is obviated.

These and other objects of the invention will be manifest from the following brief description and accompanying drawing.

Of the accompanying drawing:

Figure 1 is a view, partly broken away and in section, illustrating the tool embodying the invention in an initial operative position with respect to a tire mounted on a wheel assembly.

Figure 2 is a view, similar to Figure 1, illustrating the tool in a final operative position.

Figures 3 and 4 are plan views of the two parts of the tool shown in either Figures 1 or 2.

Figure 5 is a fragmentary cross-section of the tool, on an enlarged scale, taken substantially on line 5—5 in Figure 1.

Figure 6 is a view similar to Figure 5, taken substantially on line 6—6 in Figure 2.

Referring to the drawing, the numeral 10 designates a wedging member formed with a handle portion 11, which terminates at one end in a relatively flat wedging jaw 12 which is adapted to be inserted between flange 13 of a rim R and the bead portion 14 of a tire T mounted on said rim, the latter being of the forementioned safety type having annular locking ridges 15 on the bead seats 16, 16 thereof for engaging the inner edges of the tire beads to lock the same on the rim. The wedging jaw 12 may have formed in one face thereof a longitudinally extending recess 17 providing laterally spaced side edges 18, 18, which taper toward the outer end of the jaw. The side edges 18 may be beveled as shown in Figure 3 for purposes subsequently to be described.

For cooperative use with the wedging member 10 a separate lever member 19 is provided. This lever may be formed with a relatively long handle portion 19a terminating at one end in a longitudinally tapering, hook-like portion, the end of which is adapted to be readily insertable in the recess 17 of wedge member 10, between rim flange 13 and tire bead 14, in the manner shown in full and chain-dotted lines in Figure 1. The curved part 21 of hook 20 is adapted to pivot on the jaw 12 of wedge member 10 with rolling motion upon operating the lever relatively of the wedge member. The side edges 22, 22 of hooked portion 20 may be tapered toward the end of the lever in a manner corresponding to the tapered edges 18, 18 of jaw 12 of wedge member 10. The arrangement is such that the lever 19 may be positioned with respect to member 10 somewhat as shown in chain-dotted lines in Figure 1, whereby upon urging the lever towards said member, substantially to the position shown in Figure 2, a rolling motion is applied to the hooked portion 20, providing a longitudinally shifting pivotal connection between the lever and the wedge member and urging the ends of the jaw 12 and hooked portion 20 apart. During this rolling pivotal movement of the lever the tapered side edges 22 of the hooked portion 20 will be in wedging engagement with the tapered edges 18 of the jaw 12. The side edges 22 of the hook-like portion 20 may be beveled to correspond to the bevel of the side edges 18 of jaw 12, as best shown in Figures 5 and 6, to insure proper seating of the cooperating parts.

In the operation of the tool for removing a tire, the jaw 12 of the wedge member 10 is first inserted or driven between the flange 13 of rim R and the bead portion 14 of the tire T mounted on said rim, as shown in full lines in Figure 1. Next, the end of the hook-like portion 20 of lever 19 is inserted in the recess 17 of said jaw 12 and urged inwardly of the rim, to engage between rim flange 13 and jaw 12, as shown in full and in chain-dotted lines in Figure 1. By urging handle 19a of the lever toward handle 11 of the wedge member, the pointed end of the hook-like portion is fulcrumed on the inner face of rim flange 13, and rolling engagement is applied between the curved portion 21 of hook portion 20 and the jaw 12, thereby urging the lever inwardly of rim flange 13 and consequently urging the bead portion 14 inwardly past the annular locking ridge 15, the tire bead thereby being effectively urged into the drop-center well 16a of the rim. During this rolling engagement between the lever and the wedge member, the curved portion 21 of the lever swings radially inwardly of the rim in an arc about the point of contact between the end of hooked portion 20 and rim flange 13. This inward movement of said curved portion, by means of the engaging tapered edges 22 and 18 of hook-like portion 20 and jaw 12, respectively, tends to urge the wedge member inwardly of the rim, thereby obviating any necessity of providing separate means for clamping or anchoring the tool to a part of the wheel assembly to prevent outward movement of the tool during the operation thereof. The wedging engagement of said tapered side edges prevents relative lateral movement of the wedge member and lever in all positions of operation of the tool. Also, because of the inward movement of wedging member during operation of the tool, it is not necessary for the operator to hold the handle of said wedge member once it has been inserted between the tire bead and rim flange.

The above procedure may be repeated for releasing the opposite tire bead from its locking ridge, after which the tire may be completely removed from the rim by the usual methods for removing tires from drop-center type rims.

As no special anchoring or clamping means is required for the tool, it readily adapts itself for removal of tires from the so-called safety type rims mounted on a wheel assembly, whether the wheel assembly be in position on a vehicle or demounted from the vehicle and placed on a flat surface.

Modifications of the invention may be resorted to provided they do not depart from the scope of the claims.

What is claimed is:

1. A tool of the class described comprising a member having a relatively flat jaw portion at one end thereof, said jaw having a recess therein providing laterally spaced side edges tapering toward the end of the jaw, and a lever having a curved end portion the side edges of which are tapered correspondingly to said tapered edges of said jaw recess, the side edges of said jaw recess and the side edges of said curved portion of the lever being reciprocally beveled, the curved end of said lever being engageable in said recess whereby the curved portion of the lever will be in rolling engagement with the jaw of said member with the tapered and beveled edges of said curved portion reciprocally engaging the tapered and beveled edges of said jaw recess.

2. A tool of the class described comprising a member having a relatively flat jaw portion at one end thereof, said jaw having a recess in one face thereof providing laterally spaced side edges tapering toward the end of the jaw, and a lever having a curved end portion the sides of which are tapered correspondingly to said tapered edges of said jaw recess, the curved end of said lever being engageable in said recess whereby the curved portion of the lever will be in rolling engagement with the jaw of said member with the tapered edges of said curved portion reciprocally engaging the tapered edges of said jaw recess.

3. A tool of the class described comprising a member having a relatively flat jaw portion at one end thereof, said jaw having a recess in one face thereof providing laterally spaced side edges tapering toward the end of the jaw, and a lever having a curved end portion the sides of which are tapered correspondingly to said tapered edges of said jaw recess, the side edges of said jaw recess and the side edges of said curved portion of the lever being reciprocally beveled, the curved end of said lever being engageable in said recess whereby the curved portion of the lever will be in rolling engagement with the jaw of said member with the tapered and beveled edges of said curved portion reciprocally engaging the tapered and beveled edges of said jaw recess.

4. A tool of the class described comprising a member having a relatively flat jaw portion provided with laterally spaced, longitudinally tapering upwardly extending edge portions, and a lever having a curved end for rolling engagement with said flat jaw portion and provided with laterally spaced longitudinally tapering edge portions along the curved end for reciprocal engagement with the edge portions of said jaw when the curved end of said lever is engaged with said jaw portion between said upwardly extending edge portions to apply rolling movement of said curved portion along said jaw portion, the direction of the reciprocally tapered edge portions on said jaw and curved end being such that the rolling engagement between the same while the lever is fulcrumed on the top of its curved end will tend to urge said member in the direction opposite to said rolling movement of the curved end.

EDWIN G. KRANTZ.